Aug. 3, 1943.                H. G. LEHMANN                2,325,912
                              COFFEE MAKER
                           Filed Aug. 3, 1940              2 Sheets-Sheet 1

INVENTOR
Herbert G. Lehmann
BY
ATTORNEYS

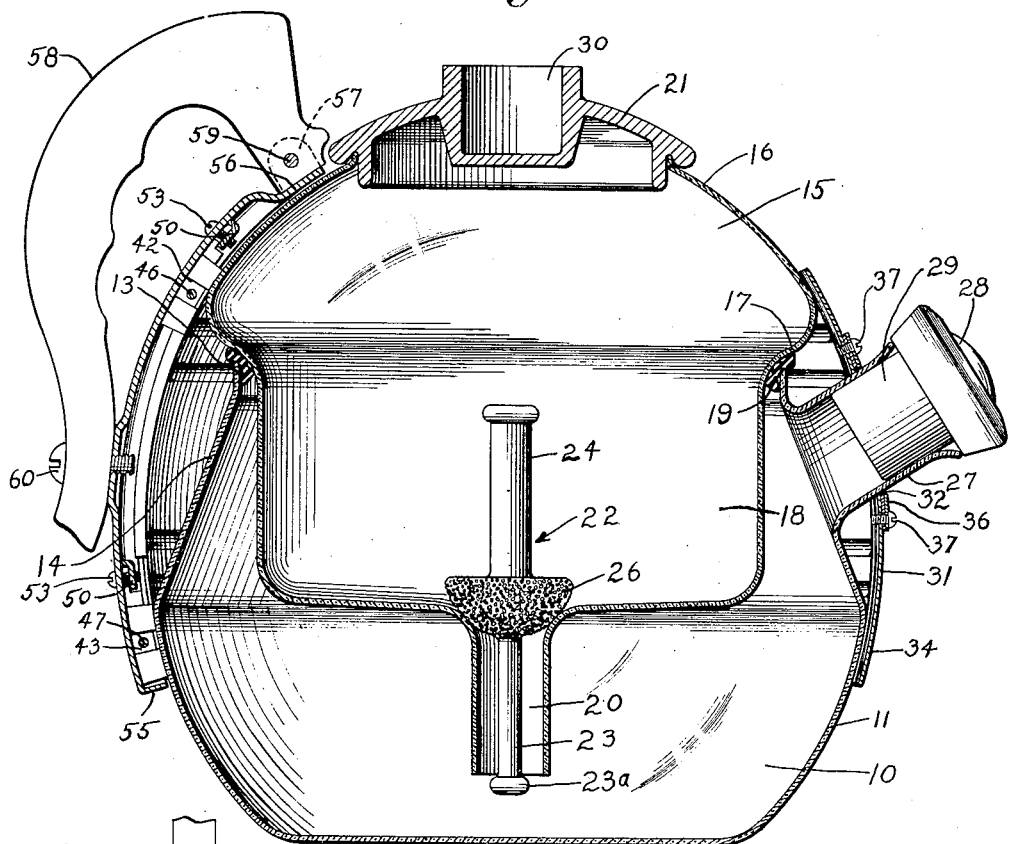

Patented Aug. 3, 1943

2,325,912

UNITED STATES PATENT OFFICE 2,325,912

COFFEE MAKER

Herbert G. Lehmann, Wood-Ridge, N. J., assignor to Casco Products Corporation, Bridgeport, Conn., a corporation of Connecticut Application August 3, 1940, Serial No. 350,311

7 Claims. (Cl. 53—3)

This invention relates to coffee makers of the type in which water heated in a lower vessel, is forced through a communicating tube provided with filter means into an upper vessel containing ground coffee by the steam pressure generated upon such heating, and subsequently drawn back through the filter into the lower vessel by the partial vacuum produced when application of heat is discontinued, and condensation of the steam occurs, the coffee grounds being retained in the upper vessel by the filter means. Such coffee makers are hereinafter designated as coffee makers of the vacuum type.

An essential feature of a vacuum coffee maker is the provision of means whereby the lower vessel is maintained airtight, except for the passage communicating with the upper vessel, during the brewing of the coffee, in order that sufficient pressure may be generated in the lower vessel upon heating to force the water into the upper vessel, and that a partial vacuum may be produced by condensation of the steam in the lower vessel to draw the coffee back again.

It has been the general practice heretofore to construct vacuum coffee makers so that airtight closure of the lower vessel was effected solely by insertion of a portion of the upper vessel therein. In such constructions, the upper vessel must be removed in order to pour the coffee. This feature is inconvenient in that breakage of the vessels is likely to occur during separation of the vessels, such separation is often difficult, and if the vessels are still hot, the hands of the manipulator may be burned. Furthermore, the upper vessel is of awkward shape and cannot be readily stored when removed from the lower vessel. In some cases, a vertical tubular stand is provided to receive the stem of the upper vessel when so removed, but when thus stored, the stand is liable to tip over causing breakage of the vessel, since the center of gravity of the latter is relatively high.

It has also been proposed heretofore to construct vacuum coffee makers wherein the upper vessel permanently engages the lower vessel at an airtight junction, removal of the upper vessel being unnecessary for pouring the coffee. For this purpose, a spout is provided on the lower vessel which is closed by means of a removable stopper. When the stopper is in position, vacuum or pressure may be generated in said vessel during the brewing of the coffee, and subsequently when the stopper is removed, the coffee may be poured through the spout.

A primary difficulty in such constructions is the necessity of admitting air to the lower vessel when the coffee is poured, since the wet coffee grounds are generally packed around the filter, shutting off passage of air from the upper to the lower vessel.

Consequently, without other provision for admission of air, air must enter the lower vessel through the spout. In constructions known heretofore, the spout was constructed in such a manner, that the coffee covered the inner end of the spout, or filled the spout when poured at a normal rate, especially when the lower vessel was filled to the desired maximum capacity. Under these circumstances, air enters the spout in slugs or bubbles causing flow of the coffee to be irregular, as a result of which the coffee splashes as it issues from the spout and runs into a cup. In some cases perforated baffles interposed in the spout further obstructed free passage of air into the lower vessel.

In my copending applications, Serial No. 293,875 filed September 8, 1939, now Patent No. 2,286,990, granted June 16, 1942, Serial No. 301,524 filed October 27, 1939, now Patent No. 2,277,025, granted March 24, 1942, and Serial No. 322,671 filed March 7, 1940, now Patent No. 2,258,589, granted October 17, 1941, I have disclosed means for overcoming this difficulty by admitting air to the lower vessel of a vacuum coffee maker during pouring of the coffee through an auxiliary air inlet operated by a valve mechanism.

It is an object of this invention to provide simplified means for admitting air to the lower container of a vacuum coffee maker which is adapted to be used for pouring coffee without removal of the upper vessel, by suitable modification of the construction of the spout and shape of both vessels.

Further objects include the provision of a coffee maker of the vacuum type of pleasing appearance, and sturdy and durable construction, having minimum overall dimensions and weight for a maximum coffee brewing capacity, adapted to produce coffee of superior quality, and adapted to be conveniently and economically manufactured.

In accomplishing the aforesaid objects, the coffee maker of the present invention comprises an upper vessel, open at the top and preferably provided with a loosely fitting cover, a portion of said vessel fitting into a lower vessel. The upper vessel is supported upon the lower vessel by means of an annular shoulder which engages the edge of the lower vessel. Means, such as an annular gasket is provided to form an airtight seal between said shoulder and edge during the brewing and pouring of coffee.

A tubular passage extends downward from the base of the upper container to a level near the bottom of the lower container, and filtering means is provided to permit passage of water from the lower vessel into the upper vessel through said passage and to retain coffee grounds in the upper vessel while permitting coffee to return from said upper to said lower vessel.

A tubular spout provided with a removable airtight closure is attached to the wall of the lower vessel.

In order to provide ample passage for air through the spout into the lower vessel during the pouring of coffee, contained in said vessel in amounts up to the maximum desired capacity, a relatively wide, unobstructed tubular spout is provided on the wall of the lower vessel having such length, diameter, and angular position, that the level of a liquid contained in said vessel in an amount corresponding to the maximum desired capacity does not fill the spout and preferably does not rise above the center of the spout at any point when the coffee maker is tilted into its initial pouring position.

The said spout is preferably cylindrical, whereby it is adapted to receive a cylindrical stopper as an airtight closure, and is preferably inclined upwardly from the wall of said lower container.

The volume of the upper vessel is distributed approximately equally above and below the supporting edge of the lower vessel, and preferably, the base of the upper vessel extends into the lower vessel to a level about half way between the edge and the base of the latter, the level of liquid filling the lower vessel to the maximum desired capacity being not materially above the base of the upper vessel. The spout is preferably attached to the wall of the lower vessel above the level of the said maximum desired quantity of liquid.

The volumes and shapes of said vessels are so related that the said maximum desired quantity of liquid rises in the upper vessel well above the supporting edge of the lower vessel during brewing of coffee.

By virtue of this feature, the infusion in the upper vessel is cooled by loss of heat through the walls of said vessel which are not surrounded by the steam in the lower vessel, and as a result, the extraction of bitter oils from the coffee is reduced as compared with the extraction of the aromatic oils thereof, producing coffee of superior quality or taste.

In order to provide means for fastening the said vessels together, the upper portion of the walls of the upper vessel are sloped inward toward the top, and the lower portion of the walls of the lower vessel are sloped inward toward the base. A jacket surrounding the coffee maker embraces both of said sloping surfaces, securing the said vessels firmly together.

The said jacket is preferably so constructed as to form an annular air space surrounding the upper portion of the lower vessel, which serves to retard loss of heat from said vessel. As a result, condensation of steam therein is retarded after brewing the coffee in the upper vessel, and the sudden development of excessive vacuum tending to collapse the lower vessel is avoided. This feature results therefore in greater safety during operation, since collapse of the vessels is liable to cause injury to persons in the vicinity. Futhermore, the necessity for replacement of collapsed vessels is reduced to a minimum resulting in a material economy.

Preferably, in order to provide a coffee maker of pleasing appearance and minimum size and weight for a given capacity, the inwardly sloping upper portion of the upper vessel and lower portion of the lower vessel, and the jacket embracing said surfaces are constructed of substantially spherical contour. The upper portion of the lower vessel is preferably constructed to slope conically inward toward the upper edge thereof. By providing a spherical jacket surrounding said conical surface, the insulating annular air space mentioned above is provided. The provision of a conical surface also effects a saving of material in constructing the lower vessel as compared with a continuous spherical surface. In the preferred form of the invention, the spout is attached to the conical portion of the side wall of the lower vessel.

The vessels of the coffee maker of the aforesaid preferred form are adapted to be conveniently and economically manufactured from glass by use of a turn or paste mold.

In my copending applications, Serial No. 293,875 filed September 8, 1939, now Patent No. 2,286,990, granted June 16, 1942, Serial No. 301,524 filed October 27, 1939, now Patent No. 2,277,025, granted March 24, 1942, and Serial No. 322,671 filed March 7, 1940, now Patent No. 2,258,589, granted October 17, 1941, I have disclosed means for fastening together the upper and lower vessels of a substantially spherical vacuum coffee maker, comprising a metal band or casing encircling the vessels and extending over the spherical surfaces of the upper and lower vessels in the form of a zone, said band being separable into an upper and lower part.

It is a further object of the present invention to provide an improved means for securing the upper and lower parts of a vacuum coffee maker together whereby the appearance of the appliance is materially improved, and the upper and lower vessels thereof are securely urged into engagement.

Means whereby this object is attained also comprises a zone-shaped metal band or casing encircling the junction of the upper and lower vessel, but separable into semicircular halves joined together at one end by suitable clamping means and at the other end by adjustable draft means whereby the tension of the band may be tightened to urge the upper and lower vessels together.

A feature of the said improved construction of the said band or jacket is the absence of a horizontal line of separation between the upper and lower parts thereof, whereby its appearance is materially improved.

It is also preferred to provide means on said jacket or casing for attaching a handle thereto, said means covering the draft means at one junction of the semicircular halves. The casing is held against rotation about the spherical surface of the coffee maker by virtue of the fact that the spout extends through an aperture in the casing, the edges of which aperture preferably conform to the contour of the spout.

Another object of the present invention is the provision of improved filtering means for coffee makers of the vacuum type.

One improved filter comprises a filtering member, such as a plug of roughened glass, adapted to be loosely supported at the upper end of the communicating tubular passage between the upper and lower vessels. A rod extending downward from said member through said passage carries a lateral projection on its lower end which engages the edge of said passage when the rod and filtering member are tilted in said passage. A handle extending upward from said member is of such weight and dimensions as to cause tilting of said filter in the direction of pouring when the coffee maker is tilted for this purpose. Engagement of the lateral projection on the lower end of said rod with the edge of the said passage prevents the filter from falling out of said passage during pouring of the coffee.

Another improved filter comprises a novel filter support whereby the filter is positively urged into engagement with the bottom surface of the upper vessel adjacent to the upper end of the tubular extension which communicates with the lower vessel, said filter support being adapted to be easily and conveniently inserted into said tube, or removed therefrom when it is desired to clean the coffee maker.

For this purpose, a perforated filter supporting plate is slidably mounted on a stem which extends downward into the tubular extension of the upper vessel and also upward above the filter supporting plate. Detent means on the lower end of the stem engages the lower end of said tubular extension, and resilient means supported on the stem urges the perforated plate against the bottom of the well portion of the upper vessel adjacent to the junction of the tubular extension. The upper end of the stem terminates in a handle above said plate for convenient manual removal thereof from the coffee maker.

Further features and advantages will be apparent from the following description.

In the accompanying drawings which illustrate one form of the present invention, that at present preferred, Figure 1 is a view in side elevation of the vacuum coffee maker.

Fig. 2 is a cross-sectional view of the coffee maker showing a stopper positioned in the spout for brewing coffee.

Fig. 3 is a detail in front elevation of a support for attaching a handle to the casing which encircles the coffee maker, the said support covering the draft means shown in Fig. 4.

Fig. 4 is a detail in front elevation of draft means for securing or tightening the casing whereby the upper and lower vessels of the coffee maker are held together.

Fig. 5 is a detail in cross-section taken substantially along the line 5—5 in Fig. 6, of clamping means for fastening together the ends of the semicircular halves of said casing opposite the draft means.

Fig. 6 is a detail in front elevation of the said casing showing the aperture through which the spout of the coffee maker protrudes.

Fig. 7 is a vertical cross-section of a novel filter support according to the present invention.

Fig. 8 is a cross-section of the coffee maker showing the approximate level of the maximum desired quantity of a liquid contained in the lower vessel thereof.

Fig. 9 is a cross-section similar to Fig. 8 showing the level of a similar quantity of liquid when the coffee maker is tilted to its initial pouring position.

Figure 1:
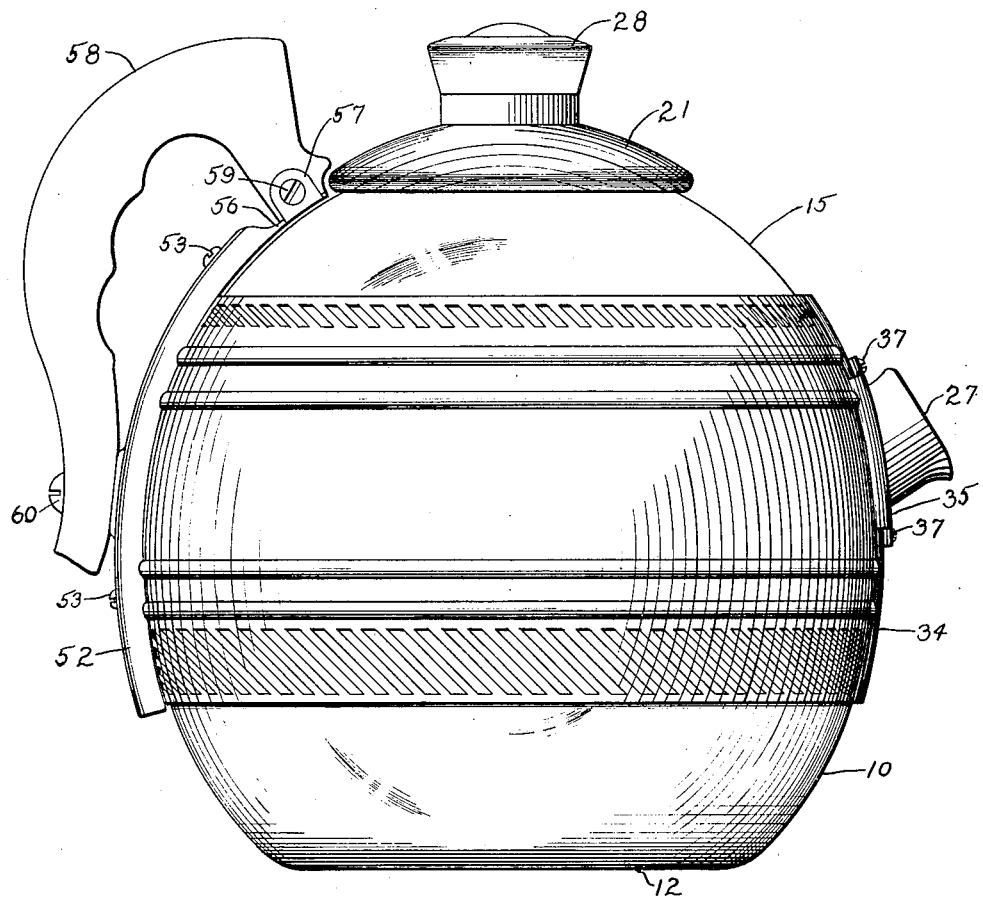
Figure 1:
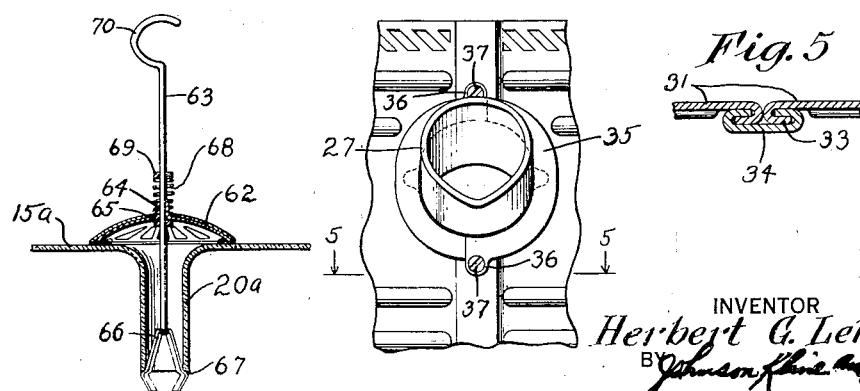

The coffee maker as shown in Figs. 1 to 6 comprises a lower vessel or container 10 which may be advantageously made of heat-resistant glass, such as Pyrex. The exposed walls 11 of said container are substantially spherical in shape. The bottom 12 may be flattened to provide means for supporting the coffee maker upon a flat surface. The upper edges 13 of the said vessel terminate materially above the center of the sphere.

The upper portion 14 of the walls of said vessel are preferably constructed of a conical rather than spherical shape whereby the weight of the vessel is somewhat reduced and the glass or other material required therefor is decreased.

An upper vessel 15 which may also be advantageously made of glass is provided, having an upper exposed substantially spherical surface 16 terminating in an annular shoulder 17 which engages the edges 13 of the lower vessel. The upper vessel 15 extends downward into the lower vessel in the form of a well 18. An annular gasket 19 is provided to support the upper vessel on the edges 13 of the lower vessel, providing an airtight seal between the two vessels during the brewing and pouring of coffee.

A tubular extension 20 forms a communicating passage between the upper and lower vessels and terminates at its lower end near the bottom of the lower vessel 10. An opening covered by a removable cap 21 is provided at the top of the upper vessel 15. The cap is loosely fitted to permit air to pass into or out of the upper vessel.

The volume of the upper vessel 15 is preferably substantially equally distributed above and below the level of the supporting edge of the lower container 10, and preferably, the said upper vessel extends into the lower vessel approximately half way from the said edge to the bottom of the latter. As a result of this arrangement, water filling the lower vessel approximately to the level of the bottom of the upper vessel is forced upward into the latter during the brewing of coffee, attaining a level in said upper vessel well above the supporting shoulder 17. The consequent loss of heat through the walls of the upper vessel which are not surrounded by the steam in the lower vessel, tends to cool the contents of the upper vessel. This cooling effect tends to reduce extraction of the bitter oils of the coffee to a much greater extent than that of the aromatic oils, whereby the flavor of the coffee is greatly improved.

A filter 22 which may be made of glass is provided comprising an inverted mushroom-shaped plug 26 engaging the upper orifice of the tubular extension 20, a rod 23 extending downward through the tube 20 and terminating in a knob 23a below the end of said tube, and a handle 24 extending upward therefrom. The surface of the said mushroom-shaped plug is roughened or beaded as shown, whereby liquid may pass between the surface thereof and the contacting surface of the vessel 15, but coffee grounds are prevented from being carried along with the liquid when the coffee is drawn into the lower vessel 10.

The handle 24 is of such weight and length that the filter 22 tilts in the direction of pouring when the coffee maker is tilted for this purpose. The knob 23a forms a lateral projection on the end of the rod 23 which is adapted to engage the lower end of the tube 20, thus preventing the filter from falling out of the said tube whereby damage to the upper vessel or to said filter when coffee is poured from the coffee maker might occur.

A spout 27 is attached to the conical side wall 14 of the lower vessel 10. The said spout may have any desired tubular shape, but is preferably in the form of a cylinder, which may be tilted upward at a suitable angle from said vessel. The outer end may be flared to provide a pouring lip if desired. The said spout is provided with a stopper 28 comprising a plug 29 fitting in airtight relation into the outer end of said spout.

The said spout is so positioned with respect to the upper and lower vessels of the coffee maker that a line tangent to the pouring lip of the spout, passing through the center of the bottom surface of the well 18 of the upper vessel does not intercept the upper interior surface of the spout, and preferably passes below the midpoint of the base orifice thereof where it joins the wall 14 of the upper vessel.

As indicated in Fig. 8, the maximum desired level of the liquid in the lower vessel 10 of the coffee maker is substantially defined by the base of the well portion 18 of the upper vessel 15 since it is desired after the coffee is brewed that all of the liquid in the upper vessel should be drawn into the lower vessel. As a result of the aforesaid disposition of the spout, when the coffee maker is tilted into initial pouring position as shown in Fig. 9, the liquid does not fill the spout, and in fact, the level of the liquid in the spout does not rise above the center of the spout at any portion thereof. By virtue of this feature, ample passage is provided for air to enter the lower vessel when coffee is poured therefrom, even when the lower vessel contains the maximum desired quantity of coffee, and the coffee flows from the spout in a steady stream, without gurgling and consequent splashing.

Preferably a cup-like recess 30 is provided in cap 21, which closes the opening in the upper vessel 15, for storing the said stopper 28 when it is desired to pour coffee through the spout.

Means comprising a jacket 31, hereinafter more fully described, is provided to secure the upper and lower vessels together. The said jacket is of spherical contour and extends over the spherical surfaces of the upper vessel 15 and the lower vessel 10 above and below the conical portion 14 of the latter. As a result, an annular air space is formed between said conical wall and said jacket which tends to insulate the upper portion of the lower container against loss of heat. As a result, the rate of condensation of the steam in the lower vessel 10 after the coffee has been brewed in the upper vessel 15 is retarded, thus avoiding the sudden development of an excessive vacuum in the lower vessel, which would tend to cause the latter to collapse. Thus, the lower vessel may be constructed of thinner glass while insuring safety in operation, whereby the weight and cost of the coffee maker is reduced.

In order to use the coffee maker for making coffee, a quantity of water is introduced into the lower vessel, either through the spout 27 after removal of the stopper 28, or through the opening in the top of the upper vessel 15, after removal of the filter 22 and cap 21. Since it is desired after the coffee is brewed that all of the coffee should be contained in the lower vessel 10, the quantity of water introduced is limited so that its level does not rise substantially above the lower surface of the well 18, as shown in Fig. 8. A quantity of ground coffee is placed in the upper vessel after inserting the filter 22 into the tube 20. The stopper 28 is inserted into the spout 27, the cap 21 is replaced, covering the opening at the top of vessel 15, and the coffee maker is heated. As the water boils, steam is generated, forcing the water to rise in the tube 20 and pass through the filter and the surrounding coffee into the upper vessel 15. When the level of the water in the lower vessel 10 falls below the lower end of the tube 20, steam passes up through the tube agitating and heating the liquid in the upper vessel. The cap 21 acts as a baffle, preventing the coffee from splashing out of the upper opening.

When the heating is discontinued, condensation of the steam in the lower vessel 10 causes a partial vacuum to be produced, and atmospheric pressure forces the coffee in the upper vessel 15 back into the lower container 10. The filter 22 prevents particles of the ground coffee from being carried along with the liquid.

The stopper 28 is then removed and placed in the cup-like recess 30 in the cap 21. The coffee may then be conveniently poured, the construction of the spout insuring an ample passage for air into the lower vessel of the coffee maker whereby irregular flow or gurgling of the coffee while pouring is avoided.

As hereinbefore stated, the upper and lower vessels of the coffee maker are secured together during use by means of a metal casing 31 of spherical contour preferably in the form of a zone-shaped band encircling the coffee maker at its greatest horizontal diameter. The edges of the said casing extend over the spherical surfaces of the said upper and lower vessels above and below this junction and above and below their widest horizontal diameter, preventing separation of the two vessels and clamping them securely together. As shown in Fig. 1, the band or casing may be constructed of an ornamental design to enhance the appearance of the coffee maker. An aperture 32 is provided through which the spout 27 extends, and on the opposite side, means is provided for attaching a handle 58 to said casing. The casing is vertically split at one side to permit its assembly with the vessels of the coffee maker, and is preferably separable into two semicircular halves to facilitate said assembly.

The aperture 32 through which the spout extends is preferably formed at one line of separation between the said halves. Above and below said aperture, the ends of the band 31 are bent backward providing hooked flanges 33 which are engaged by corresponding clamps 34 to hold the ends together. A split annular collar 35, the ends of the segments of which are provided with overlapping ears 36, is assembled around the edges of aperture 32, encircling the spout 27; the said collar being formed in such a manner as to conform to the contour of the clamp 34 and the surface of the casing 31. It is secured in place by means of screws 37 which are threaded into corresponding holes in the clamp 34.

The other ends of the semi-circular halves of the casing 31 are provided with draft means whereby said casing may be tightened around the coffee maker. This draft means comprises strips of reenforcing metal 38 and 39 which are secured to the two ends of the casing respectively, for instance by spot welding. For further reenforcement, the middle portions of the said strips are retained by reverse flanges 40 and 41 which are respectively integral with the two halves of the band 31. At its upper and lower end, strip 38 is provided with outwardly bent flanges 42 and 43, and strip 39 is similarly provided with flanges 44 and 45. Bolts 46 and 47 extend through holes in flanges 44 and 45 and are engaged by corresponding threaded holes in the flanges 42 and 43. By tightening the said bolts, the metal casing 31 may be tightened securely against the surface of the upper and lower vessels of the coffee maker. The said strips may be cut away as indicated at 48 and 49 to facilitate insertion and tightening of the bolts 46 and 47.

Means for supporting a cover for the said draft means is provided by L-shaped extensions 50 and 51 at the upper and lower ends of strip 39. The said extensions are reenforced by upwardly flanged edges 50' and 51'.

A cover plate 52, supported upon flanges 42, 43, 44 and 45, is fastened in place by means of screws 53, engaging threaded holes 54 on the transverse portion of the L-shaped extensions 50 and 51. The edges of the said cover are flanged downward as indicated at 55 to conceal the reenforcing strips 38 and 39 and the rest of the draft means, whereby the appearance of the coffee maker is materially improved.

The upper end of said cover plate is provided with an extension 56 having a pair of upwardly bent perforated ears 57. The upper end of a handle 58 is engaged by a bolt 59 extending through said ears. The other end of the said handle is secured to the cover plate 52 by a bolt 60 engaging a threaded hole 61 in the surface of said cover.

The means comprising the metal casing 31 and the draft means is intended to retain the upper and lower vessels of the coffee maker permanently in engaged relation during use. However, if it becomes necessary to remove the upper vessel from the lower in order to replace the gasket 19, or in order to cleanse the coffee maker, the cover plate 52 may be removed by unscrewing screws 53 and the casing 31 may be similarly removed by unscrewing bolts 46 and 47. The casing 31 is retained against rotation about the center of the spherical coffee maker by engagement of the edges of aperture 32 with the spout 27. Thus the said spout constitutes a support for said casing.

The present invention also comprises a novel filter support as shown in Fig. 7, which may replace the filter 22. It comprises a perforated filter plate 62, adapted to engage the lower surface of the upper vessel 15a of a vacuum coffee maker, adjacent the orifice of a tubular extension 20a. The said filter plate is slidably supported on a stem 63, engaging the latter by means of a flanged portion 64 and a welded reenforcing collar 65. At its lower end, the stem 63 is provided with a clip 66 of resilient metal having a plurality of arms, each of which is provided with a shoulder 67, and the outwardly extending ends of which are bent inward toward each other. The shoulder 67 is adapted to engage the lower end of the tubular extension 20a in the manner of a detent. By virtue of the inwardly bent ends of the clip 66, the latter may be readily inserted into the upper end of the tubular extension 20a.

When the detent means comprising the clip 66 engages the tubular extension 20a, as hereinbefore explained, filter plate 62 is urged against the surface of the vessel 15a by a compression spring 68 supported against a collar 69 which is affixed to the stem 63, for instance, by welding. The upper end of the stem 63 is bent in the form of a hook as shown at 70 to form a handle, whereby the filter support may be conveniently introduced or withdrawn from the tubular extension 20a.

In order to use the filter support, a filter cloth having a central hole is slipped over the handle 70, stem 63, collar 69, and spring 68, until it rests upon the perforated plate 62. The edges of the filter cloth are bent under the edges of said perforated plate and drawn together by means by a draw thread in the well-known manner.

When the filter support is inserted into the tubular extension 20a until the detent means, comprising the clip 66, engages the lower end of said tubular extension, the filter cloth covering the surface of the perforated plate 62 is urged against the surface of the upper vessel 15 by the spring 68, providing an efficient seal against passage of coffee grounds from the upper vessel to the lower vessel, when liquid is drawn through the said filter.

In the broader aspects of the present invention, the stem 63 is yieldably carried by the plate 62 so that it may be moved with respect to the wall engaging edge of the plate 62. By depressing the handle 70, detents are carried by the stem into engagement with the lower end of the tubular extension so as to be held in engagement therewith by the yieldably carried stem upon release of the handle. The stem, for instance, may be carried by resilient fingers lanced from the filter plate 62 and the spring 68 need not be used. To increase the resiliency of the fingers, the same may be nonradially, for instance, spirally lanced from the plate.

Variations and modifications may be made within the scope of this invention and portions of the improvements may be used without others.

I claim:

1. In a coffee maker of the vacuum type comprising two vessels, one superposed upon the other, having a substantially spherical contour when assembled, means for securing the two vessels together comprising a broad zone-shaped metal casing extending over the spherical surfaces of said vessels on each side of their junction, said casing being vertically split at one side; and adjustable draft means for fastening together the ends of the split casing whereby the casing is adapted to be tightened about the coffee maker, securely clamping the vessels into engagement.

2. In a coffee maker of the vacuum type comprising two vessels, one superposed upon the other, having a substantially spherical contour when assembled, and a spout protruding from the lower vessel, means for securing the two vessels together comprising a broad zone-shaped metal casing extending over the spherical surfaces of said vessels on each side of their junction, said casing being vertically split at one side; adjustable draft means for fastening together the ends of the split casing whereby the latter is adapted to be tightened about the coffee maker securely clamping the vessels together; and an aperture in said casing through which the spout protrudes, the edges of which aperture engage the spout, preventing rotation of the casing about the coffee maker.

3. In a coffee maker of the vacuum type comprising two vessels, one superposed upon the other, having a substantially spherical contour when assembled, and a spout protruding from the lower vessel; means for securing the two vessels together comprising a broad zone-shaped metal casing extending over the spherical surfaces of the said vessels on each side of their junction, said casing being vertically split at one side; adjustable draft means for fastening together the ends of the split casing whereby the casing is adapted to be tightened about the coffee maker securely clamping the vessels together; an aperture in said casing opposite said draft means, through which the spout protrudes, the edges of which engage the spout preventing rotation of the casing about the coffee maker; a cover fastened to said casing for covering the draft means; and a handle affixed to said cover.

4. A coffee maker of the vacuum type comprising a lower vessel having a substantially semispherical lower portion and a frusto-conical upper portion; an upper vessel adapted to fit within said lower vessel and having a portion projecting downwardly thereinto, the bottom wall of said downwardly projecting portion of the upper vessel being coincident with the line of jointure between said upper and lower portions of said lower vessel; a tube carried by the bottom wall of said upper vessel and extending into said lower vessel to a point adjacent the bottom thereof; means for securing the two vessels together; and a pouring spout extending substantially normal to the inclined wall of said upper portion of the lower vessel and being so positioned with respect to said vessel that brewed coffee filling the same to a maximum level defined by the bottom wall of said upper vessel does not fill the spout upon tilting the coffee maker to a pouring position whereby said spout provides free access of air to the lower vessel during pouring of the coffee contained therein.

5. A coffee maker of the vacuum type comprising a lower vessel having a substantially semispherical lower portion and a frusto-conical upper portion; an upper vessel supported by said lower vessel, said upper vessel having a well received within said lower vessel, the lower wall of said well being coincident with the line of jointure between the upper and lower portions of said lower vessel and defining a maximum level of liquid to be placed in said lower vessel; a tube carried by the bottom wall of said well projecting downwardly to a point adjacent the bottom of said lower vessel; means for permanently securing the vessels together so as to form a unitary utensil for brewing and pouring coffee; a pouring spout on said lower vessel extending substantially normal to the inclined wall of the upper portion thereof, said spout being so positioned with respect to said lower vessel that liquid to the level defined by the lower wall of said well does not fill the spout when the coffee maker is tilted to its pouring position so that air may freely enter through said spout to replace the liquid poured therethrough.

6. A coffee maker of the vacuum type comprising a lower vessel having a substantially semispherical lower portion and a frusto-conical upper portion with an opening formed therein; an upper vessel, said upper vessel having a substantially semispherical upper portion seated on the rim edge of said opening and a cylindrical lower portion depending within said lower vessel; a tube carried by the bottom wall of the said upper vessel and extending into said lower vessel to a point adjacent the bottom thereof; a relatively broad band encircling said superposed vessels at their line of junction; means for drawing the opposite ends of said band together whereby the band is clamped about said vessels to hold the upper vessel tightly seated on said lower vessel; and a pouring spout extending substantially normal to the inclined wall of said upper portion of the lower vessel and being so positioned with respect to said vessel that brewed coffee filling the same to a maximum level defined by the bottom wall of said upper vessel does not fill the spout upon tilting the coffee maker to a pouring position whereby said spout provides free access of air to the lower vessel during pouring of the coffee contained therein.

7. In a coffee maker of the vacuum type, a pair of superposed vessels, the lower vessel having an opening at its top into which the upper vessel extends, said upper vessel having an annular shoulder of a larger diameter than said opening and adapted to cooperate with the rim edge thereof to support and position the upper vessel upon the lower vessel, the shoulder being so located that substantially half of said upper vessel is enclosed within the lower vessel; a tube extending downward from the bottom of the upper vessel; means carried by the rim edge of said opening to form an airtight seal between said shoulder and said edge; a jacket for holding the upper vessel tightly seated on said lower vessel, said jacket being spaced from the upper portion of the wall of the lower vessel to provide an air space for partially insulating said wall against the passage of heat; and a pouring spout carried by said lower vessel and having such length and width and angular position relative to said lower vessel as to permit a quantity of liquid, filling the lower vessel to a maximum level such that the upper vessel contains no material amount thereof when the coffee maker is in upright position, to be poured through the spout without filling the same to permit air to freely enter said lower vessel through the spout to replace liquid poured therefrom.

HERBERT G. LEHMANN.